Jan. 1, 1935.  E. H. TAYLOR  1,986,419

COUPLING MEANS

Filed Jan. 9, 1933

Inventor:
Edward Hall Taylor
By: Brown, Jackson, Boettcher & Dienner,
Attys.

Patented Jan. 1, 1935

1,986,419

UNITED STATES PATENT OFFICE 1,986,419

COUPLING MEANS

Edward Hall Taylor, Oak Park, Ill.

Application January 9, 1933, Serial No. 650,767

4 Claims. (Cl. 285—140)

This invention relates to coupling means, and has to do with means for securing together pipe ends and analogous articles so as to provide a fluid-tight and pressure-resistant joint therebetween.

Pipes provided at their end portions with outwardly projecting shoulders or flanges formed integrally with, or otherwise permanently secured to the pipes, are frequently coated with enamel or other suitable coating material. It is desirable, for this reason, as well as for shipping purposes and other reasons, that sectional coupling rings or flanges be used to secure together the ends of pipes of this type.

When continuous coupling rings or flanges are used, which is possible only with pipe having abutment elements or shoulders which are removable to permit of placing of the coupling rings or flanges about the pipe, no great difficulty is encountered in obtaining a satisfactory fluid-tight and pressure-resistant joint between the pipe ends. In using continuous coupling rings or flanges, the pressure to which these members are subjected in forcing them toward each other is transmitted substantially uniformly to the respective rings throughout the full circumference thereof. Even though this pressure may be sufficiently great to cause dishing of the rings to a certain extent, there is no objectionable tipping, twisting, or distortion of some portions of the rings relative to other portions thereof, and a tight joint is assured.

In the use of sectional coupling flanges, serious difficulty is frequently encountered due to tipping and twisting of the sections thereof under the severe pressure to which they are of necessity subjected. This tipping and twisting is more apparent at the end portions of the sections, though it is present in varying degrees throughout the full length of the respective sections. This results in distortion of the flange sections and unequal distribution of the pressure to which they are subjected, accompanied by tipping of the sections, and renders it extremely difficult and frequently impossible to obtain an entirely satisfactory fluid-tight and pressure-resistant joint between the pipe ends. These difficulties are encountered in the use of all sectional coupling flanges with which I am familiar.

The primary object of my invention is to provide sectional coupling flanges which will avoid the above noted objections to sectional flanges now in use, and will assure a reliable fluid-tight and pressure-resistant closure or joint between the pipe ends. While my invention is particularly well suited to sectional coupling flanges, it can also be applied to advantage to continuous coupling rings or flanges, as will be hereinafter pointed out. A further object is to provide a pipe coupling which is durable, of simple construction, comprises few parts and can be assembled with facility and expedition. Further objects and advantages of my invention will appear from the detailed description.

In the drawing:—

Figure 1:
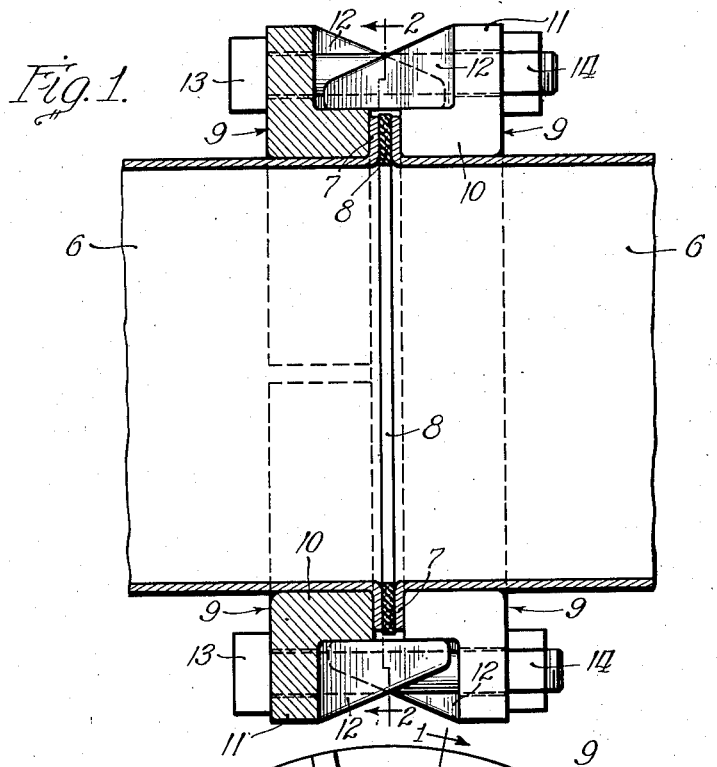
Figure 1 is a sectional view through a coupling in accordance with my invention, as applied, the pipe ends being shown fragmentarily and in section, this view being taken substantially on line 1—1 of Figure 2.
Figure 2:
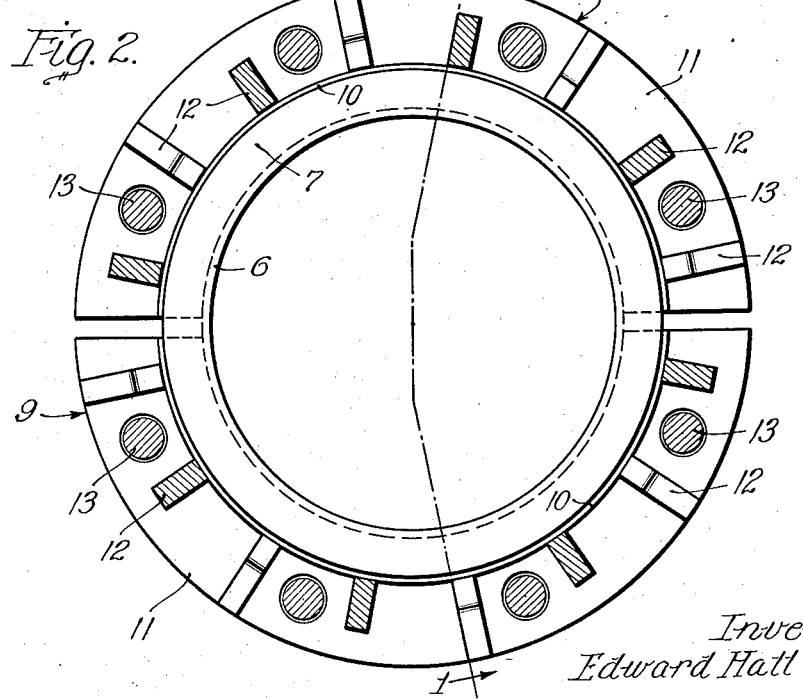
Figure 2 is a section taken substantially on line 2—2 of Figure 1, parts being shown in elevation.

The coupling of Figures 1 and 2 comprises pipe ends 6, each provided with an outwardly extending radial flange 7 formed integrally with the pipe end. The flanges provide shoulders or abutment elements for contact with coupling flanges, to be later described. These shoulders or abutment elements may be formed and disposed as shown, or they may be formed and disposed in any other manner suitable to accomplish the desired results. Preferably, a suitable gasket 8 is disposed between the flanges or shoulders 7, though this gasket may not be essential in all instances. The shoulders 7 are forced toward each other by coupling flanges 9 so as to provide, in conjunction with the gasket 8, when this gasket is used, a fluid-tight and pressure-resistant joint or closure between the ends of the pipes 6.

The coupling flanges 9 are of sectional construction, as shown, so as to be positioned about the pipe ends with facility, and the joints of these flanges may be disposed in lapped relation. Each flange 9 is of angle cross-section and comprises a hub 10 extending lengthwise of the pipe 6 and a body 11 extending from the outer edge of hub 10 and disposed radial to the pipe. The inner edge of hub 10 is flat and is disposed for contact with the outer face of the adjacent pipe shoulder 7, it being noted that body 11 is remote from this inner edge of the hub. The outer face of hub 10 of each of the flanges 9 provides bearing surfaces for arms 12 formed integrally with the body 10 of the respective coupling flanges 9, the arms of one flange extending therefrom toward the other flange and spanning the joint between the pipe ends so as to bear upon the hub of said other flange. The arms 12 cooperate with hubs 10 so as to prevent tipping of the coupling flanges relative to the pipe ends, when these flanges are forced toward each other in contact with the pipe shoulders 7, while permitting of movement of the coupling flanges toward each other.

The flanges 9 are secured together by means of bolts 13 and cooperating nuts 14, the bolts passing loosely through bodies 11 of the flanges. Any other suitable or preferred means may be employed for forcing the flanges toward each other, though ordinarily I prefer to employ the bolt and nut means shown. By turning the nuts 14 tightly onto the bolts 13, flanges 9 are forced toward each other so as to clamp the pipe shoulders 7 tightly between the hubs 10 of the flanges. During this movement of the flanges toward each other, the arms 12 cooperate with hubs 10 of the flanges and effectively prevent twisting or distortion of the sections of the coupling flanges, while also preventing tipping thereof relative to the pipe ends, as previously noted. This is advantageous in that it assures that the hubs of the coupling flanges evenly contact the shoulders of the pipe ends at all points along the flange sections, and that the pressure applied to the pipe shoulders 7 is substantially uniform, assuring a pressure resistant and fluid-tight joint between the pipe ends, which joint is durable and highly efficient.

In applying my invention to continuous coupling rings or flanges, the parts are constructed and cooperate in the same manner as in sectional flanges, the only difference being that the flanges are continuous instead of sectional. A coupling constructed in accordance with my invention and employing continuous flanges is advantageous in that objectionable dishing of the flanges is prevented, assuring a more accurate fit of parts and a tighter and more durable joint than is possible with coupling flanges of ordinary type, and the flanges may be made lighter than is permissible under present practice since the flanges and associated parts, in the coupling of my invention, cooperate to resist objectionable dishing of the flanges.

As above indicated, and as will be understood by those skilled in the art, changes in construction and arrangement of parts of my invention may be resorted to without departing from the field and scope of the same, and I intend to include all such variations as fall within the scope of the appended claims, in this application in which the preferred forms only of my invention are disclosed.

What I claim is:—

1. In combination in a pipe coupling comprising shouldered pipe ends, coupling flanges disposed about the respective pipe ends and free for movement toward each other, said flanges each comprising a hub and a body extending outward from the outer edge of said hub, means for forcing the flanges toward each other, and means carried by each of the flanges and cooperating with the hub of the other flange for preventing tipping of said flanges relative to the pipe ends while permitting movement of the flanges toward each other.

2. In combination in a pipe coupling comprising shouldered pipe ends, coupling flanges of angle cross-section disposed about the pipe ends with the angles of the flanges opposed and opening outward from the pipe ends, said flanges being free for movement toward each other, means for forcing the flanges toward each other, and means carried by each of the flanges and cooperating with the other flange for preventing tipping of the flanges relative to the pipe ends while permitting movement of said flanges toward each other.

3. In combination in a pipe coupling comprising shouldered pipe ends, coupling flanges disposed about the pipe ends, each comprising a hub of appreciable width and a body extending from the hub remote from the inner edge thereof and substantially radial to the pipe end, the inner edge of said hub being disposed to contact the outer face of the adjacent pipe shoulder, means engaging the bodies of the flanges for forcing the latter toward each other, and arms rigid with each of the flanges, said arms spanning the joint between the pipe ends and bearing upon the outer face of the hub of the other flange and cooperating therewith to prevent tipping of the flanges relative to the pipe ends while permitting movement of said flanges toward each other.

4. In combination in a pipe coupling comprising shouldered pipe ends, coupling flanges disposed about the pipe ends and each provided with bearing surfaces, each of the flanges having spaced rigid arms projecting toward the other flange and cooperating with the bearing surfaces of the latter to prevent tipping of the flanges relative to the pipe ends while permitting movement of the flanges toward each other, and means for forcing said flanges toward each other.

EDWARD HALL TAYLOR.